March 9, 1926.　　　G. F. PACKARD　　　1,576,002
ELECTRIC MOTOR
Filed March 13, 1923　　　3 Sheets-Sheet 1
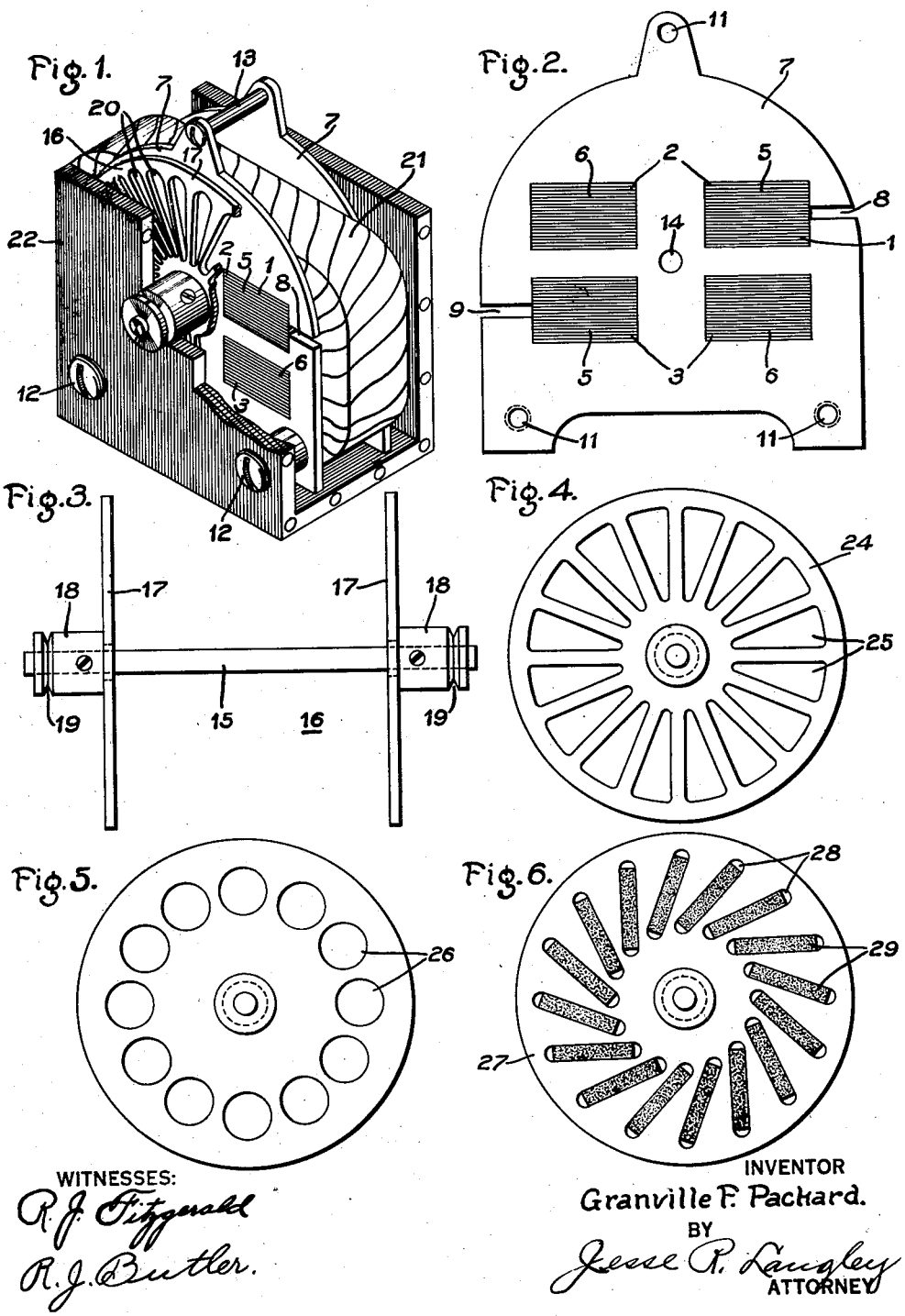

March 9, 1926.
G. F. PACKARD
ELECTRIC MOTOR
Filed March 13, 1923   3 Sheets-Sheet 2
1,576,002
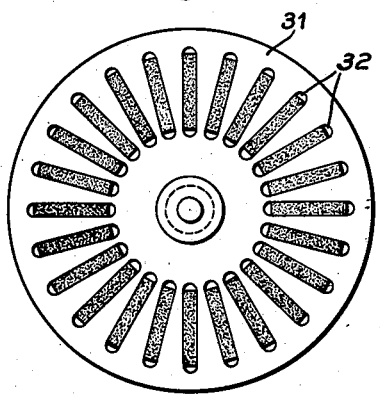
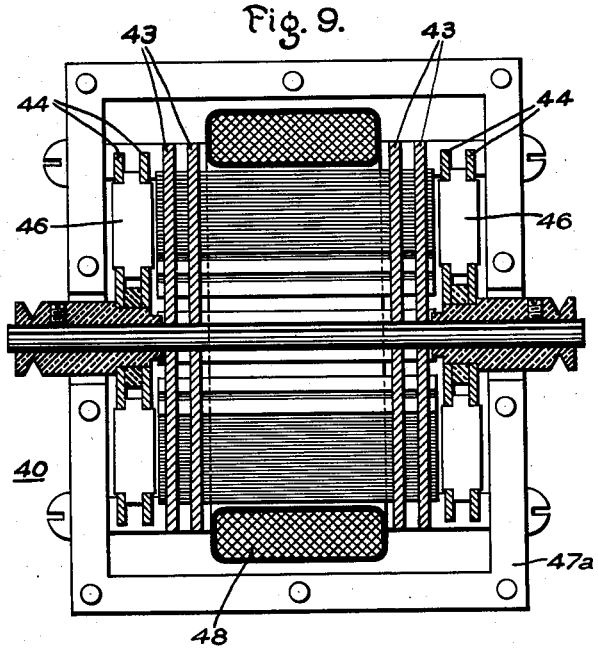
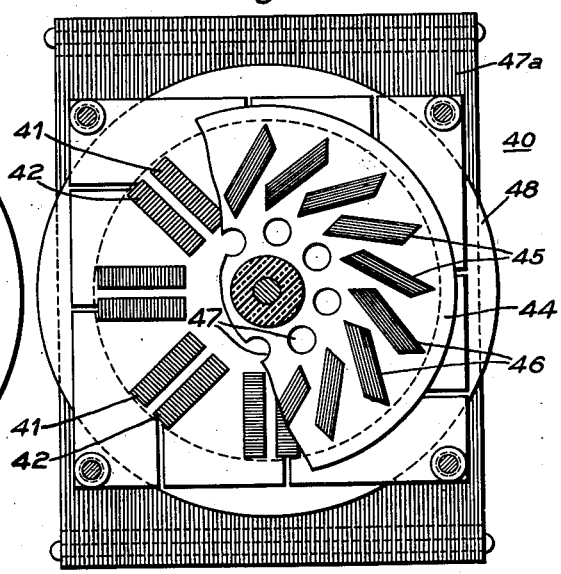
WITNESSES:
R. J. Fitzgerald
R. J. Butler.
INVENTOR
Granville F. Packard.
BY
Jesse R. Langley
ATTORNEY March 9, 1926.                G. F. PACKARD                1,576,002
                              ELECTRIC MOTOR
                          Filed March 13, 1923          3 Sheets-Sheet 3

WITNESSES:
G. J. Fitzgerald
R. J. Butler.

INVENTOR
Granville F. Packard.
BY
Jesse P. Langley
ATTORNEY

Patented Mar. 9, 1926.

1,576,002

UNITED STATES PATENT OFFICE.

GRANVILLE F. PACKARD, OF WILKINSBURG, PENNSYLVANIA.

ELECTRIC MOTOR.

Application filed March 13, 1923. Serial No. 624,739.

*To all whom it may concern:*

Be it known that I, GRANVILLE F. PACK-ARD, a citizen of the United States, and a resident of Wilkinsburg, in the county of Allegheny and State of Pennsylvania, have invented a new and useful Improvement in Electric Motors, of which the following is a specification.

My invention relates to electric motors, and particularly to motors of the induction type that are suitable for light power applications.

One object of my invention is to provide a motor of the type described above having a rotor that is constructed to provide definite paths for magnetic flux and eddy currents traversing it.

A second object of my invention is to provide a motor of the induction type with a rotor having portions of different magnetic reluctance.

Another object of my invention is to provide a rotor for an induction motor having portions that differ in electrical conductivity.

A further object of my invention is to provide a motor having improved facilities for dissipating heat from its various parts.

I have found that the operating characteristics of a motor of the induction type may be improved by providing the rotor with perforations which provide definite paths for eddy currents that may be induced therein by the primary core structure. I have found, also, that the operating characteristics of such motors may be improved by providing the rotors with portions the magnetic reluctance of which is relatively low.

A motor constructed in accordance with my invention is provided with ample spaces for ventilating the various parts whereby heat may be dissipated rapidly and efficiently therefrom. Certain of the parts are constructed of double plates of relatively thin material rather than of a single plate of relatively thick material in order that the rate of dissipation of heat therefrom may be materially increased.

In the accompanying drawings,

Figure 1 is a perspective view of a motor constructed in accordance with my invention, a portion being broken away;

Fig. 2 is a front elevational view of the core structure and a secondary plate member;

Fig. 3 is a side view of the rotor;

Figs. 4 and 5 are end views of rotors having perforations of modified form;

Figs. 6 and 7 are end views of rotors in which the perforations are occupied by material of relatively low magnetic reluctance;

Fig. 8 is an end view of a primary member and a secondary member in which the polar projections are arranged at angles to the corresponding radii;

Fig. 9 is a cross-sectional view of a motor in which certain of the members are constructed of spaced plates;

Fig. 10 is a view in transverse section of the motor of Fig. 9, a portion of the rotor being broken away;

Figure 11:
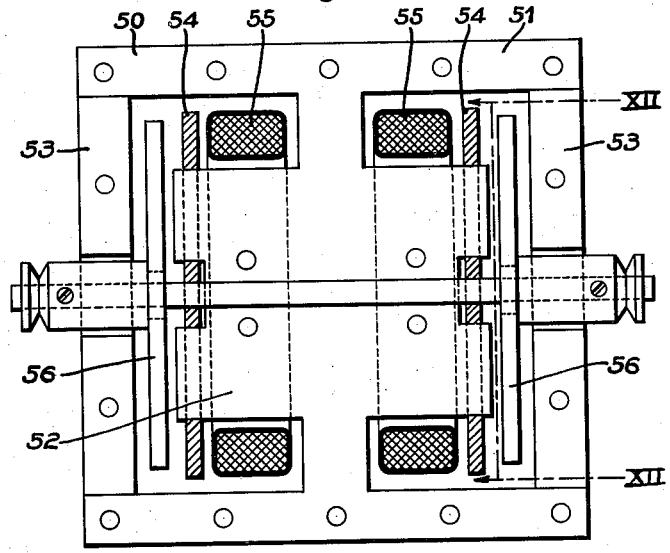
Fig. 11 is a view in longitudinal section of a motor provided with a plurality of windings and magnetic circuits.

The motor shown in Figs. 1, 2 and 3 comprises a stationary core structure 1 of laminations extending longitudinally of the motor axis. The laminations are divided into two spaced groups 2 and 3, an upper and a lower group, as viewed in Figs. 1 and 2. Each group is suitably recessed at each end across its central portion whereby the two pairs of polar projections 5 and 6 thus constituted may be surrounded by a secondary plate member 7.

Each of the secondary plate members 7 is provided with slits 8 and 9 adjacent to diagonally opposite polar projections 5, while the polar projections 6 are surrounded by a continuous band of metal to constitute the equivalent of a shading coil. The secondary plates are provided with suitable holes 11 for bolts 12 and 13 for retaining them in assembled position, the bolt 13 constituting a convenient handle for the motor. A central hole 14 is also provided to constitute a bearing for the shaft 15 of a rotor 16.

The rotor 16 comprises a pair of disks 17 that are mounted on the respective ends of the shaft 15 and adjacent to the corresponding polar projections 5 and 6. A hub 18 on each end of the shaft has a groove 19, whereby a belt may be employed to drive suitable mechanism. The disks 17, as shown in Fig. 1, are provided with radially-extending perforations 20 for a purpose to be hereinafter set forth.

The core structure 1 is surrounded by a single energizing coil 21 that is adapted to be connected to a source of single-phase energy. An external portion of the magnetic circuit of the motor is provided by a laminated structure 22 of U-shape, which serves also as a protective casing for the motor.

The provision of the external laminated structure insures that a greater percentage of flux from the poles passes through the plane of the disk and correspondingly increases the efficiency of the motor.

The operation of the motor occurs when the coil 21 is energized. The poles 5 and 6 would ordinarily be of the same polarity simultaneously but the latter are surrounded by the plates 7 which constitute secondary windings or shading coils to cause the poles 6 to be out of phase with the poles 5 as will be understood. Rotation of the rotor is accordingly caused by the reactions between the poles 6 and the fields established by eddy currents in the disks 17 induced by flux from the poles 5.

The theory of the operation of a motor of the same general character as that of my present invention is described in my Patent 1,534,282.

The perforations 20 in the rotor disks have a two-fold purpose. In addition to insuring better ventilation and dissipation of heat from the rotor, the paths of eddy currents induced by the poles 5 and 6 are limited to the conducting material surrounding the perforations. I have found that the provision of a rotor thus constructed materially improves the torque and other operating characteristics of the motor.

While the reasons for the improvement above noted are not definitely known, it is probable that the perforations prevent shifting angularly of the currents induced in the rotor disks 17 and tend to cause the latter to rotate in synchronism with what are, in effect, rotating fields established by the phase displacement of the magnetization of the members of the pairs of poles.

In the rotor disk 24 shown in Fig. 4, the perforations 25 are triangular in form, the structure resembling a wheel with spokes radiating from a central hub portion.

In the modification shown in Fig. 5, the perforations 26 are circular in form, the centers of the circles and the centers of the polar projections being substantially equidistant from the motor axis.

In the rotor 27 of Fig. 6, the perforations 28 are at an angle to the corresponding radii. The perforations are occupied by material of low reluctance, such, for example, as iron indicated at 29, in order to increase the proportion of useful flux through the disk and thereby correspondingly increase the strengths of the magnetic fields induced therein. The angularity of the perforations is such that adjacent ones overlap each other whereby some portion of at least one of them is in alinement with each of the poles. This arrangement insures that a substantially uniform flux traverses the disk irrespective of its angular position.

The disk 31 shown in Fig. 7 has radially-extending perforations 32 that are similar in shape to those of Fig. 6. The perforations 32 are occupied by material of low reluctance. The number of perforations is relatively large whereby the flux traversing the disk is substantially uniform in its various positions.

It will be noted that the numbers of perforations in the various forms of rotors shown and described herein are even numbers and that, in most instances, the number is a multiple of the number of pairs of poles shown in the motor of Fig. 1. However, I have found that the motor will operate satisfactorily when an odd number of perforations is employed or when the number is not a multiple of the numbers of poles of the primary member.

In Fig. 8, I have illustrated a primary core structure 34 and a secondary plate 35 wherein the pairs of polar projections 36 and 37 and the corresponding openings in the plate are inclined to the radii passing therethrough. This structure is, in effect, a reversal of parts of a motor of the type of Fig. 1 having a rotor with inclined perforations such as that of Fig. 6.

The motor 40 shown in Figs. 9 and 10 differs from that of Fig. 1 in a number of features. The pairs of polar projections 41 and 42, which are disposed circumferentially about the motor axis, extend radially therefrom. The secondary plates 43 consist of duplicate members spaced apart to provide ventilation and thereby avoid excessive heating. The rotors also consist of two spaced disks 44 with inclined perforations 45 occupied by laminated iron 46 in order to provide flux paths of low reluctance through the rotors. The rotor disks 44 are also each provided with a ring of circular perforations 47 to further improve the ventilation. As clearly shown in Fig. 9, the external laminated structure 47 is of rectangular shape and constitutes a casing for the motor. The casing provides return paths of low reluctance for flux traversing the disks of the rotors. A single energizing coil 48 surrounds the groups of laminations.

The motor of Figs. 9 and 10 operates with high efficiency because of the very low reluctance of the magnetic paths comprising the laminations 46. The effect of the perforations is substantially unchanged by the presence of the laminations 46 since eddy currents do not traverse them circumferentially of the disk 44. The spaced arrangement of the parts insures ample ventilation to prevent excessive heating.

Figure 12:
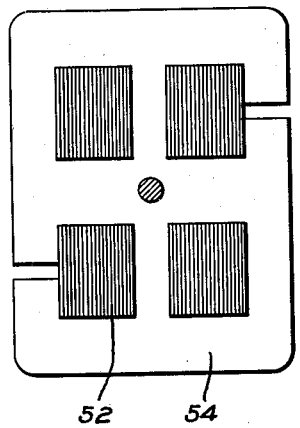
Fig. 12 is an end view of the primary member and a secondary plate member of the motor of Fig. 11.

Reference may now be had to the modification illustrated in Figs. 11 and 12. The structure 50 consists of laminations 51 of approximately H-shape that constitute the primary core member 52 and the top and the bottom of the casing for the motor and of laminations 53 that constitute the end portions of the casing. Each end of the core member 52 is provided with a secondary plate member 54 that is similar to those of Fig. 1 except in shape.

A coil 55 surrounds each end of the core member 52. A rotor comprises a disk 56 adjacent to each end of the core member 52, the disks being of the perforated type of any of the forms hereinbefore described.

The principal characteristics of the motor of Figs. 11 and 12 are that parallel magnetic circuits of relatively short length are provided whereby the reluctances are relatively low and that, in effect, two motors are provided in a single unitary structure with a single rotatable member.

Figure 13:
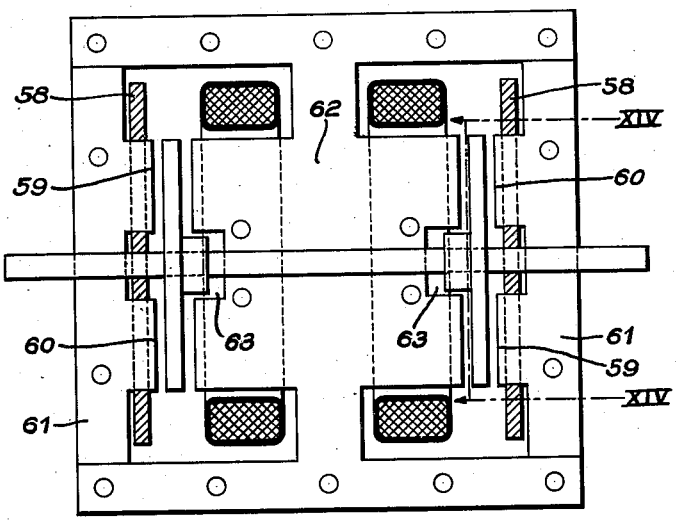
Fig. 13 is a view similar to Fig. 11 of a modification.
Figure 14:
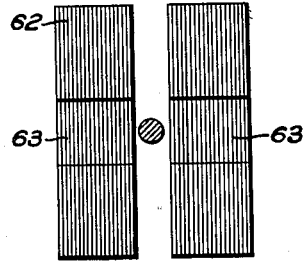
Fig. 14 is an end view of the core structure of the motor of Fig. 13.

The motor of Figs. 13 and 14 is similar to that of the motor just described except the secondary plate members 58 are disposed around polar projections 59 and 60 that are provided on the laminations 61 constituting the end portions of the casing. The ends of the core member 62 are notched at 63 to prevent leakage of flux between other than the poles and adjacent parts, in alinement therewith.

The motors of Figs. 11 and 12 and Figs. 13 and 14 operate on the same principles as the motor of Fig. 1.

While I have shown the laminations of certain of the several core members as extending transversely to the lines joining the members of the several pairs of polar projections, it may be desirable in certain cases to arrange the laminations parallel to such lines as in the poles 41 and 42 of Fig. 10. The transverse arrangement appears to have the desirable characteristic of preventing local circuits of magnetic flux when the coacting poles are displaced in phase and, therefore, are of different polarity at certain portions of the cycles of the single-phase source of energy.

It will be understood that the several principal parts of the motors constructed in accordance with my invention are susceptible of many changes in arrangement of parts, of paths for magnetic and electrical circuits and in materials employed and that my invention is not limited to the structures shown and described herein except as indicated by the appended claims.

I claim as my invention:

1. An electric motor comprising a primary member having a plurality of pairs of polar projections and a rotor comprising a disc having a plurality of separate members of magnetic material extending therethrough, the number of said last-named members being a multiple of the number of pairs of polar projections.

2. An electric motor comprising a primary member having a plurality of polar projections and a disc inductively related thereto, said disc having a plurality of perforations extending at an angle relatively to the corresponding polar projections.

3. An electric motor comprising a primary member having a plurality of polar projections and a disc inductively related thereto, said disc having a plurality of magnetizable members therein, said members being inclined relatively to the corresponding polar projections.

4. An electric motor comprising a primary member having a plurality of polar projections and a disc inductively related thereto, said disc having a plurality of perforations extending at such angle relatively to the corresponding polar projections that at least one of said perforations is always in alinement with each of said polar projections.

5. An electric motor comprising a primary member having a plurality of polar projections and a disc inductively related thereto, said disc having a plurality of magnetizable members therein, said members being so inclined relatively to the corresponding polar projections that at least one of said magnetizable members is always in alinement with each of said polar projections.

6. An electric motor comprising a primary member having a core structure with poles certain of which are provided with shading coils, a magnetizing coil, and a pair of rotatable discs having a common shaft and coacting with said poles, said discs being provided with perforations having magnetic material disposed therein to aline with said poles, corresponding perforations and pole faces having different angles relatively to the same radii of said discs.

7. An electric motor comprising an external field structure and an internal core structure, centrally supported therein, having at each end a plurality of polar projections, a magnetizing coil mounted on each end of said internal structure, and a rotor inductively arranged at each end of said internal core structure.

8. The combination with a core structure having a plurality of polar projections, of a plurality of spaced conducting plate members each of which surrounds said polar projections to provide short-circuited secondary windings for certain of said polar projections.

9. The combination with a magnetizable core structure having a plurality of polar projections at one end thereof, of a rotatable member adjacent to said polar projections comprising a plurality of disks having a ventilating space therebetween.

10. The combination with a magnetizable core structure having a plurality of polar projections, of a rotatable member adjacent to said polar projections comprising a plurality of spaced perforated disks having magnetizable members in the perforations and extending between said disks.

11. A motive device having a primary member provided with longitudinally-extending polar projections and a secondary member comprising a plate member having openings through which said projections extend to provide shading coils for certain of said projections.

12. An electric motor comprising a stationary external field structure, an internal core structure supported thereby and having a plurality of longitudinally-extending polar projections at each end thereof, a magnetizing coil surrounding each end of said core structure, and a rotor inductively related to each group of polar projections.

13. A motive device having a primary member provided with a plurality of polar projections, a plate member of conducting material having openings through which certain of said polar projections extend, and a rotatable secondary member adjacent to said plate member.

14. A motive device comprising a primary member having a magnetizable portion provided with a plurality of polar projections and having, also, a plate member of conducting material through which said projections extend to provide shading coils for certain of said projections, the plate member being provided with slits adjacent to the remaining projections to maintain an open circuit therearound, and a rotor coacting with said primary member.

In testimony whereof, I have hereunto subscribed my name this 1st day of March 1923.

GRANVILLE F. PACKARD.